United States Patent Office 2,978,480
Patented Apr. 4, 1961

2,978,480
BIS-(ALKYL SULFONYL AND SULFOXYL) ALIPHATIC ACID DERIVATIVES

Raymond W. Luckenbaugh, Wilmington, Del., assignor to E. I. du Pont de Nemours and Company, Wilmington, Del., a corporation of Delaware No Drawing. Filed May 8, 1957, Ser. No. 657,721

4 Claims. (Cl. 260—465.1)

This invention relates to bis-(alkyl sulfonyl and sulfoxyl) aliphatic acid derivatives, to their formulations for use as pesticides, and to methods for the control of pests.

More particularly, the invention is directed to pesticidal compositions containing at least one novel bis-(alkyl sulfonyl or sulfoxyl) alkyl carboxylic acid ester or alkyl nitrile characterized by the formula (1) 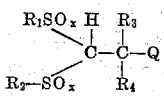

where: $R_1$ and $R_2$ are the same or different and are substituted or unsubstituted lower alkyl groups or substituted or unsubstituted aryl groups, $R_3$ and $R_4$ are either hydrogen or substituted or unsubstituted lower alkyl groups, Q is either —CN or —COOR$_5$, $R_5$ is alkyl of 1 to 18 carbon atoms, and $x$ is 1 or 2.

By "lower alkyl" is meant alkyl groups containing less than seven carbon atoms. When such alkyl groups are further substituted, the substituents are hydroxyl, halo (preferably chloro or bromo), nitro, and cyano. Unless otherwise indicated in this application the word "alkyl" indicates an unsubstituted saturated aliphatic hydrocarbon radical. By "aryl" is preferably meant phenyl and, when such aromatic nuclei are substituted, the substituents are hydroxyl, halo (preferably chloro or bromo), nitro and cyano.

Preferred embodiments of the present invention are those compounds within the scope of Formula 1 above when $R_1$ and $R_2$ are the same and are substituted or unsubstituted alkyl of 1 to 3 carbon atoms, $R_3$ and $R_4$ are the same and are hydrogen, methyl or ethyl, Q is —COOR$_5$ or —CN, $R_5$ is alkyl of 1 to 18 carbon atoms, and $x$ is 2.

The bis-(sulfonyl and sulfoxyl) substituted alkyl carboxylic acid esters and alkyl nitrile derivatives represented by Formula 1 can be made by various methods. One method which is very satisfactory consists in reacting appropriate halides with bis-(alkylsulfonyl) methanes or bis-(alkylsulfoxyl) methanes. This preparative method can be more fully understood by reference to the following two equations:

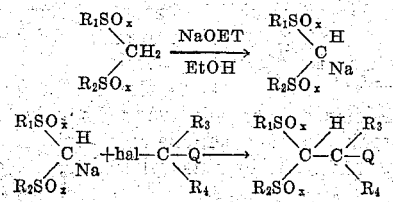

where $R_1$, $R_2$, $R_3$, $R_4$ and Q have the same significance as in Formula 1 and hal represents halogen.

The sodio bis-(alkyl or aryl sulfonyl) methanes used as starting materials for the above-indicated process can be made in accordance with the procedure described by M. W. Cronyn, J. Am. Chem. Soc. 74, 1228–9 (1952). In brief, this procedure comprises adding, say, 0.625 mole of a bis-(alkyl or aryl sulfonyl) methane to a solution of 14.4 g. (0.625 mole) of sodium dissolved in 200 cc. of warm absolute ethanol. The resulting mixture is swirled and warmed for a few minutes to give a clear solution. The solution is cooled rapidly to room temperature and dry ether (200–250 cc.) is added in portions with swirling until a faint cloudiness appears. The ether should not be used to force the product from solution or it will be amorphous and hygroscopic. If the salt does not immediately crystallize, the mixture is warmed momentarily. The mixture is then cooled in air, filtered, and the precipitate collected, and washed with 1 : 1 alcohol-ether to give about a 90% yield of the sodio bis-(alkyl or aryl sulfonyl) methane. The resulting compound is stable as long as it is protected from carbon dioxide and moisture. Exposure to air, however, does not noticeably change the appearance of the salt.

The sodio salt of the disulfone (or disulfoxide) can be monoalkylated with an appropriate halide by a variety of methods. In one method molecular equilavents of the sodio salt and the halide is thoroughly mixed in a volume of dimethylformamide which is generally 1.5 to 2 times the weight of the sodio salt. The time required to reach a nearly neutral solution is about 30 minutes at 80–90° C. for a bromide and an hour at 115–120° C. for a normal chloride. These times are preferably doubled. The solution is stirred. The reaction mixture is then diluted with water. Usually the product crystallizes upon cooling and is collected by filtration. If the product remains an oil, it can be extracted with ether, dried, and concentrated. Crystallization can be induced with petroleum ether.

The sodio salt can also be made in the dimethylformamide by adding the bis-(alkylsulfonyl)-methane to a stirred suspension of sodium hydride in dimethylformamide cooled in an ice-bath. After the initial vigorous reaction has subsided the mixture is stirred at room temperature until nearly all of the sodium hydride has reacted.

An alternative method of monoalkylating the sodio salt is to heat and stir equivalent amounts of the sodio salt and the bromide in an oil-bath at 155–165° C. for 15 to 30 minutes. The product is worked up as in the previously described method. Chlorides and secondary bromides may require higher temperatures and longer heating.

Still another monoalkylation method comprises melting potassium hydroxide in ten times its weight of diethyl carbitol. The solution is stirred during cooling. The disulfone is added and the mixture stirred and heated in an oil-bath. When the internal temperature has risen to 130° C., and most of the water has been removed by distillation, the bromide is added and the stirring and heating is continued in an oil-bath maintained at 150–160° C. for an hour or until the solution is neutral.

A fourth method for monoalkylating the sodio salt involves refluxing equivalent amounts of the sodio salt of the disulfone and the bromide in absolute ethanol for 36 to 48 hours. The alcohol is then removed, and the product obtained as in method first described above.

The bis-sulfones and sulfoxides used to prepare the sodio bis-(alkyl or aryl sulfonyl) methanes can be made by any of the following methods:

(1) Method described by M. W. Cronyn, J. Am. Chem. Soc. 74, 1228 (1952).

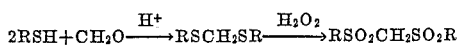

$$2RSH + CH_2O \xrightarrow{H^+} RSCH_2SR \xrightarrow{H_2O_2} RSO_2CH_2SO_2R$$

(2) Method of preparation of mixed sulfoxides and sulfone.

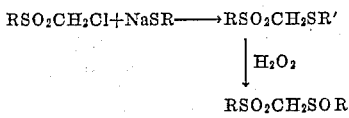

$$RSO_2CH_2Cl + NaSR' \longrightarrow RSO_2CH_2SR'$$
$$\downarrow H_2O_2$$
$$RSO_2CH_2SOR'$$

An alternative route to the bis-(alkyl sulfonyl and sulfoxyl) aliphatic acid derivatives of Formula 1 involves the oxidation of an appropriate disulfide which can be prepared by condensation of a mercaptan with aldehydes. This route can be illustrated by the following equations:

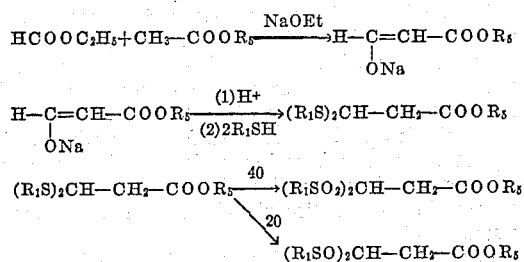

$$HCOOC_2H_5 + CH_2-COOR_5 \xrightarrow{NaOEt} H-C=CH-COOR_5$$
$$\qquad\qquad\qquad\qquad\qquad\qquad\qquad |$$
$$\qquad\qquad\qquad\qquad\qquad\qquad\qquad ONa$$

$$H-C=CH-COOR_5 \xrightarrow[(2)2R_1SH]{(1)H^+} (R_1S)_2CH-CH_2-COOR_5$$
$$|$$
$$ONa$$

$$(R_1S)_2CH-CH_2-COOR_5 \xrightarrow{40} (R_1SO_2)_2CH-CH_2-COOR_5$$
$$\searrow 20$$
$$(R_1SO)_2CH-CH_2-COOR_5$$

wherein $R_1$ and $R_5$ have the same significance as in Formula 1. It will be understood that any of a wide variety of oxidizing agents common to the art for oxidizing sulfides to sulfones and sulfoxides can be used. For example, there may be used hydrogen peroxide, peracetic acid, potassium permanganate and the like.

Still another alternative method for preparing the compounds of Formula 1 involves the addition of two molecules of a mercaptan to the triple bond of a propiolic acid ester, followed by oxidation. This reaction can be illustrated by the following general equations:

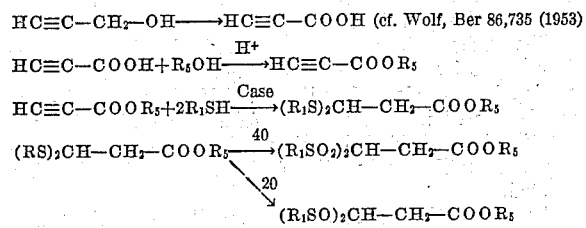

$$HC\equiv C-CH_2-OH \longrightarrow HC\equiv C-COOH \text{ (cf. Wolf, Ber 86,735 (1953)}$$
$$HC\equiv C-COOH + R_5OH \xrightarrow{H^+} HC\equiv C-COOR_5$$
$$HC\equiv C-COOR_5 + 2R_1SH \xrightarrow{Case} (R_1S)_2CH-CH_2-COOR_5$$
$$(RS)_2CH-CH_2-COOR_5 \xrightarrow{40} (R_1SO_2)_2CH-CH_2-COOR_5$$
$$\searrow 20$$
$$(R_1SO)_2CH-CH_2-COOR_5$$

wherein $R_1$ and $R_5$ have the same significance as in Formula 1. A suitable method for the preparation of the compounds of Formula 1 where Q is a nitrile group consisting in reacting a sodio bis-(alkyl or aryl sulfoxyl) methane with a halo acetonitrile, e.g. bromo acetonitrile. Alternatively, the sodio salt may be reacted with a halo acetamide, e.g. 2-bromo-acetamide. The formed propionamide derivative may then be converted to the corresponding nitrile by means of dehydrating agents such as phosphorus pentoxide or thionyl chloride.

The bis-(alkyl sulfonyl and sulfoxyl) aliphatic acid derivatives of Formula 1 are useful as pesticidical agents, especially as antifungal agents, and as bactericidal, and protozoicidal agents. They are of particular value because of the wide spectrum of in vitro activity, they possess against bacteria, fungi, protozoa, and algae at low concentration (less than 50 p.p.m.).

In practicing the fungicidal methods of my invention, a bis-(alkylsulfonyl or sulfoxyl) aliphatic acid derivative of the invention is applied to the material to be treated for the control of fungi at a dosage sufficient to exert fungicidal action. Accordingly, my compounds can be used, for example, to treat living plants such as vegetables, ornamental plants, and fruit-bearing trees. Also they may be used to treat organic fibers or fabrics and various cellulosic materials such as paper, cardboard and wood. Likewise, they may be used to treat paints and lubricating oils. One important utility appears to be in the control of fungus diseases of agricultural crops or ornamental plants.

The dosage employed in the fungicidal methods of the invention is largely determined by and dependent upon the particular fungicidal compound selected, and, in the case of application to vegetation, the susceptibility of the particular vegetation to the compound selected, the state and condition of growth of the vegetation to be treated, and the climatic conditions.

In general, the fungicidal compositions of my invention contain in sufficient amount to exert fungicidal action a compound of Formula 1 as an active ingredient in admixture with a carrier material or conditioning agent of the kind used and commonly referred to in the art as a fungicide (or pest control) adjuvant. Usually from about 1% to 95% by weight of the fungicidal composition is active ingredient.

The conventional fungicide adjuvants are inert solids, organic liquid diluents and surface-active agents. They provide formulations adapted for ready and efficient application using conventional applicator equipment. Thus, one or more of my fungicidally-active compounds is admixed with a fungicide adjuvant material to provide a formulation in liquid or solid form.

Solid compositions are preferably in the form of powders. They are compounded to be homogeneous powders that either can be used as such, diluted with inert solids to form dusts or suspended in a suitable liquid medium for spray application. The powders can comprise principally the active ingredient and minor amounts of conditioning agent. They can also be prepared by admixing the active compound with large amounts of finely divided inert solids. Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in wettable powder fungicidal compositions can be used. The active ingredient usually makes up from about 25 to 90% of these wettable powder compositions. Suitable diluents for conversion to dusts are talc, pyrophyllite, tobacco dust, volcanic ash and other dense rapid settling inert solids.

Liquid compositions employing one or more of the fungicidal compounds of my invention are prepared by admixing the active ingredient with a suitable liquid diluent media. The active ingredient can be either in solution or in suspension in the liquid media. Typical of the liquid media commonly employed as fungicide adjuvants are water, kerosene, Stoddard solvent, xylene, alcohols, alkylated naphthalene, and glycols. The active ingredient usually makes up from about 0.5 to 50% of these liquid compositions. Some of these compositions are designed to be used as such, others to be extended with large quantities of water.

Compositions in the form of wettable powders or liquids in many cases also include a surface-active agent of the kind sometimes referred to in the art as a wetting, dispersing or emulsifying agent. These materials cause the compositions to disperse or emulsify easily in water so as to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in articles by McCutcheon in "Soap and Sanitary Chemicals," August, September and October of 1949.

3,3-bis(ethylsulfonyl)propionic acid, ethyl ester, one of the preferred compounds of the invention, has been found to give a 100% kill of *Candida albicans* at levels of 100 p.p.m. and 20 p.p.m. within 10 minutes. Against *Glomerella cingulata*, the compound at 100 p.p.m. produced a 90% or greater kill in 10 minutes and a 100% kill in less than 5 hours; at 20 p.p.m. it produced a 90% kill in 1 hour and over a 99.9% kill in 5 hours. Against *Bacillus anthracis* and *Proteus vulgaris* 3,3-bis(ethylsulfonyl)propionic acid, ethyl ester, at 100 p.p.m. caused a 90% or greater kill in one hour and a 100% kill within 5 hours and at 20 p.p.m. it produced a 90% kill in 5 hours.

In order that the invention may be better understood, the following specific illustrative examples are given in addition to those already above indicated.

EXAMPLE 1.—PREPARATION OF 3,3-BIS(ETHYLSULFONYL)PROPIONIC ACID, ETHYL ESTER

To a mixture consisting of 60 grams of dimethylformamide and 33.2 grams (0.15 mole) of sodio bis-(ethylsulfonyl)methane there was added 25 grams of ethyl bromoacetate. The mixture was stirred. Its temperature rose rapidly from 24° C. to 84° C. The pH of the reaction mixture changed from 10 to 6. As the temperature of the solution dropped, steam heat was applied to it to insure completion of the reaction. The solution was cooled and an equal volume of water added to it. The diluted solution was steam-distilled to remove any unreacted halide. The desired product crystallized and was collected by filtration (M.P. 54.5–57.5°). Upon recrystallization from ethanol, the melting point of the purified product was found to be 67.5°–68.5° C.

*Analysis.*—Calc'd. for $C_9H_{16}O_6S$: S, 22.4. Found: S, 22.57; 22.69.

A repeat preparation analyzed as follows:

Calc'd. C, 37.8; H, 6.3; S, 22.4. Found: C, 37.17, 37.4; H, 6.27, 6.43; S, 22.14, 21.62, 21.56.

In a standardized tube dilution test, 3,3-bis-(ethylsulfonyl)propionic acid, ethyl ester, has the following antimicrobial spectrum:

| Organism | Minimum Inhibitory Concentration, gamma/ml. |
|---|---|
| Bacteria: | |
| Aerobacter aerogenes | 25 |
| Bacillus anthracis | 12 |
| Bacillus subtilis | 25 |
| Brucella abortus | 3 |
| Corynebacterium bovis | 25 |
| Diplococcus pneumoniae | 25 |
| Escherichia coli | 25 |
| Klebsiella pneumoniae A | 12 |
| Micrococcus pyogenes var. aureus | 25 |
| Mycobacterium tuberculosis bovine | 25 |
| Mycobacterium phleii | 3 |
| Neisseria catarrhalis | 3 |
| Pasteurella multocida | 25 |
| Proteus vulgaris | 12 |
| Pseudomonas aeruginosa | 50 |
| Salmonella gallinarum | 25 |
| Salmonella paratyphi | 25 |
| Salmonella pullorum | 25 |
| Salmonella typhimurium | 25 |
| Sarcina lutea | 3 |
| Shigella dysenteriae | 12 |
| Streptococcus agalactiae | 12 |
| Streptococcus pyogenes | 50 |
| Vibrio comma | 12 |
| Protozoa: | |
| Strigomonas culicidarum | 2 |
| Tetrahymena pyriformis var. geleii | <2 |
| Algae: | |
| Euglena gracilis—Incubated in light | 40 |
| Poteriochromonas stipitata—Incubated in light | 2 |
| Fungi: | |
| Candida albicans | 2 |
| Mycoderma lipolytica | 25 |
| Rhodotorula sp. | 12 |
| Saccharomyces cerevisiae | 15 |

| Organism | Minimum Inhibitory Concentration, gamma/ml. |
|---|---|
| Bacteria: | |
| Saccharomyces pastorianus | 9 |
| Torulopsis rotundata | 2 |
| Torulopsis utilis | 25 |
| Zygosaccharomyces japonicus | 2 |
| Aspergillus fumigatus | 3 |
| Aspergillus niger | 9 |
| Glomerella cingulata | 5 |
| Metarrhizium glutinarium | 3 |
| Nemospora crassa | 6 |
| Paecilomyces variota | 9 |
| Penicillium citrinum | 2 |
| Scopulariopsis brevicaulis | 6 |
| Streptomyces griseus | 1 |

Twenty parts of the 3,3-bis(ethlsulfonyl)-propionic acid, ethyl ester, produced as above-described, is mixed with 25 parts coumarone indene resin, 45 parts ethanol, and 5 parts of an alkyl, aryl polyether alcohol to give a homogeneous solution. This composition when emulsified in water gives a formulation suitable for application as a foliar fungicide, particularly against

*Alternaria solani*      *Cercospora apii*
*Venturia inaequalis*    *Diplocarpon rosae*
*Uromyces appendiculatus*  *Botrytis paeoniae*
*Phytophthora infestans*   *Plasmopara viticola*

EXAMPLE 2.—PREPARATION OF 3,3-BIS(ETHYLSULFONYL) PROPIONITRILE

To a slurry of 13.6 grams (0.1 mole) of alpha-bromoacetamide in 5 milliliters of dimethylformamide is added a solution of 22.2 grams (0.1 mole) of sodio bis (ethylsulfonyl) methane in 45 milliliters of dimethylformamide in a thin stream, while stirring. The temperature of the reaction mixture rises rapidly from 25° to 86°, then drops. The temperature is kept at 70–75° by means of external heating for a period of 30 minutes. The pH of the mixture drops to 6.5 during this period.

The reaction mixture is taken up in hot absolute ethanol and filtered to remove sodium bromide. The filtrate on cooling gives 10.2 grams of white crystals, melting point 155–165°. Recrystallization from absolute ethanol gave 7.5 grams of 3,3-bis(ethylsulfonyl)propionamide, melting point 168–169.5°.

*Analysis.*—Calc'd. for $C_7H_{15}O_5NS_2$: C, 32.7; H, 5.8; N, 5.4; S, 25.0. Found: C, 32.98; H, 5.85; N, 5.42; S, 24.73.

This amide is converted to 3,3-bis(ethylsulfonyl) propionitrile in the following manner:

Two grams (0.078 mole) of 3,3-bis(ethylsulfonyl) propionamide are heated to reflux with 10 milliliters of thionyl chloride for a period of 10 hours. The mixture is vacuum concentrated to an oil, which crystallizes upon cooling in ice. The oily crystals are washed with cold absolute ethanol and subsequently recrystallized from absolute ethanol until a contant melting point of 102.5–103.5° is reached. The white crystalline product weights one gram.

*Analysis.*—Calc'd. for $C_7H_{13}O_4NS_2$: N, 5.8; S, 26.8. Found: N, 5.55; S, 26.97.

EXAMPLE 3–21

Using the method of Example 1, that is, the reaction of halides with bis-(alkyl or aryl sulfonyl or sulfoxyl) methanes as earlier described in this specification, there are prepared the compounds of Table 1. The reactants, the amount of each employed, and the structural formula of the resulting product are set forth in this table. The examples of Table 1 are based on 0.1 mole of bis-sulfone and 0.1 mole of halide. A total of 2.3 g. of sodium in 40 ml. ethanol is used in preparation of the sodium salt (sodium hydride (2.4 g.) in dimethylformamide may also be used as already described).

Table 1

| Ex. No. | Bis-(sulfone or sulfoxide) | Wgt. (g.) | Halide | Wgt. (g.) | Product | Melting Point, degrees |
|---|---|---|---|---|---|---|
| 3 | $(CH_3SO_2)_2CH_2$ | 17.2 | $Br-CH_2-COOC_2H_5$ | 16.7 | $(CH_3SO_2)_2CH-CH_2-COOC_2H_5$ | 115–116 |
| 4 | $(CH_3SO_2)_2CH_2$ | 17.2 | $Br-CH_2-COOC_2H_3$ | 15.3 | $(CH_3SO_2)_2CH-CH_2-COOCH_3$ | 152.5–153.5 |
| 5 | $(C_6H_5-SO_2)_2CH_2$ | 29.6 | $Br-CH_2-COOC_2H_5$ | 16.7 | $(C_6H_5-SO_2)_2CH-CH_2-COOC_2H_5$ | 146–148 |
| 6 | $(C_3H_7SO_2)_2CH_2$ | 22.8 | $Br-CH_2-COOC_2H_5$ | 16.7 | $(C_3H_7SO_2)_2CH-CH_2-COOC_2H_5$ | 56–57 |
| 7 | $(C_2H_5SO_2)_2CH_2$ | 20.0 | $Br-CH_2-COOn-C_4H_9$ | 19.5 | $(C_2H_5SO_2)_2CH-CH_2-COOn-C_4H_9$ | 40–42 |
| 8 | $(C_2H_5SO_2)_2CH_2$ | 20.0 | $Br-CH_2-COOn-C_8H_{17}$ | 25.1 | $(C_2H_5SO_2)_2CH-CH_2-COOn-C_8H_{17}$ | 47–50 |
| 9 | $(n-C_4H_9SO_2)_2CH_2$ | 25.6 | $Br-CH_2-COOC_2H_5$ | 16.7 | $(n-C_4H_9SO_2)_2CH-CH_2-COOC_2H_5$ | 81–83 |
| 10 | $(C_2H_5SO_2)_2CH_2$ | 20.0 | $Br-CH_2-CN$ | 12.0 | $(C_2H_5SO_2)_2CH-CH_2-CN$ | 102.5–103.5 |
| 11 | $(i-C_3H_7SO_2)_2CH_2$ | 22.8 | $Cl-CH_2-COOC_2H_5$ | 12.3 | $(i-C_3H_7SO_2)_2CH-CH_2-COOC_2H_5$ | |
| 12 | $(C_2H_5SO)_2CH_2$ | 16.8 | $Cl-CH_2-COOC_2H_5$ | 12.3 | $(C_2H_5SO)_2CH-CH_2-COOC_2H_5$ | |
| 13 | $(C_2H_5SO)_2CH_2$ | 16.8 | $Cl-CH_2-CN$ | 7.6 | $(C_2H_5SO)_2CH-CH_2-CN$ | |
| 14 | $C_2H_5SO-CH_2-SO_2-C_2H_5$ | 17.4 | $Cl-CH_2-COOC_2H_5$ | 12.3 | $\begin{array}{c}C_2H_5SO\\ \phantom{xxx}\diagdown\\ \phantom{xxxxx}CH-CH_2-COOC_2H_5\\ \phantom{xxx}\diagup\\ C_2H_5SO_2\end{array}$ | |
| 15 | $(HOCH_2-CH_2-SO_2)_2CH_2$ | 23.2 | $Br-CH_2-COOC_2H_5$ | 16.7 | $(HO-CH_2-CH_2-SO_2)_2CH-CH_2-COOC_2H_5$ | |
| 16 | $(Cl-C_6H_4-SO_2)_2CH_2$ | 36.5 | $Br-CH_2-COOCH_3$ | 15.3 | $(Cl-C_6H_4-SO_2)_2CH-CH_2-COOCH_3$ | |
| 17 | $(CH_3SO_2)_2CH_2$ | 17.2 | $Br-CH_2-CN$ | 12.0 | $(CH_3SO_2)_2CH-CH_2-CN$ | 164.5–165.5 |
| 18 | $(C_2H_5-SO_2)_2CH_2$ | 20.0 | $Br-CH_2-COOC_{12}H_{25}(n)$ | 30.7 | $(C_2H_5SO_2)_2CH-CH_2-COOC_{12}H_{25}(n)$ | |
| 19 | $(CH_3SO_2)_2CH_2$ | 17.2 | $Br-CH_2-COOC_{18}H_{37}(n)$ | 39.1 | $(CH_3SO_2)_2CH-CH_2-COOC_{18}H_{37}(n)$ | |
| 20 | $C_6H_5-SO_2-CH_2-SO_2-CH_3$ | 23.4 | $Cl-CH_2-COOC_2H_5$ | 12.3 | $\begin{array}{c}CH_3SO_2\\ \phantom{xxx}\diagdown\\ \phantom{xxxxx}CH-CH_2-COOC_2H_5\\ \phantom{xxx}\diagup\\ C_6H_5SO_2\end{array}$ | |
| 21 | $(n-C_6H_{13}SO_2)_2CH_2$ | 31.2 | $Br-CH_2-COOC_5H_{11}(n)$ | 20.9 | $(n-C_6H_{13}SO_2)_2CH-CH_2-COOC_5H_{11}(n)$ | |

Following substantially the procedure given above, the following compounds can be prepared:

$(CH_3SO)_2CH-CH_2COOC_2H_5$ $(CH_3SO_2)_2CH-CH_2COOC_4H_9$ $(C_2H_5SO_2)_2-CH-CH_2COOC_3H_7$ $(C_2H_5SO_2)_2CH-CH_2COOC_3H_7(i)$

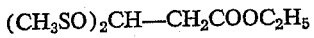

$(NO_2CH_2-CH_2SO_2)_2CH-CH_2-COOC_2H_5$ $(Cl-CH_2-CH_2-SO_2)_2CH-CH_2-COOCH_3$ $(N\equiv C-CH_2-CH_2-SO_2)_2CH-CH_2COOnC_3H_7$

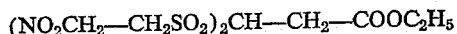

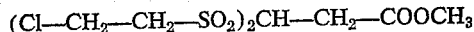

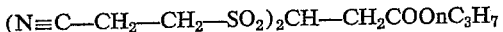

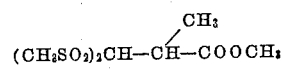

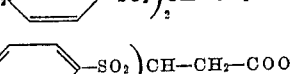

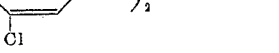

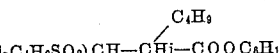

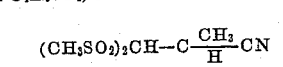

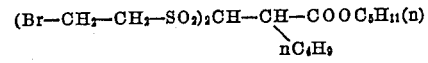

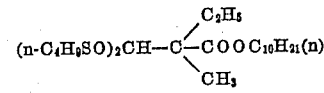

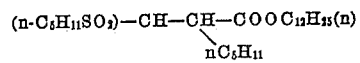

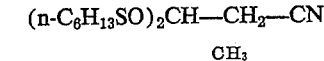

$(n-C_6H_{13}SO)_2CH-CH_2-CN$

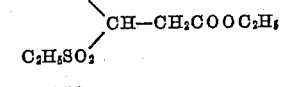

$(t-C_4H_9SO_2)_2-CH-CH_2-COOC_2H_5$ $(t-C_5H_{11}SO_2)_2-CH-CH_2COOC_2H_5$

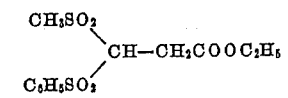

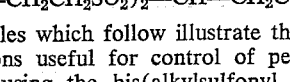

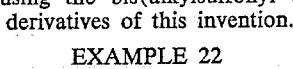

$(H_5C_2OOC-CH_2SO_2)_2-CH-CH_2COOC_2H_5$ $(NCS-CH_2CH_2SO_2)_2-CH-CH_2COOC_2H_5$

The examples which follow illustrate the wide variety of formulations useful for control of pests which can be prepared using the bis(alkylsulfonyl and sulfoxyl) aliphatic acid derivatives of this invention.

EXAMPLE 22

A suitable fungicidal formulation of the following composition is prepared by mixing the ingredients until a homogeneous solution results.

| Ingredient: | Part by weight |
|---|---|
| Bis-(3,3-ethylsulfonyl)propionic acid ethyl ester | 25 |
| Coumarone indene resin | 25 |
| Alkyl, aryl polyether alcohol ("Triton" X–155, commercially available from Rohm & Hass Co.) | 5 |
| Ethanol | 45 |

This composition can be emulsified in water and when mixed with water is especially suitable as a foliar spray for application by conventional spray equipment for the protection of living plants from fungi attack.

A suspension of containing 0.2% of bis-(3,3-ethylsulfonyl)propionic acid, ethyl ester, is sprayed on tomato foliage. After the deposit has dried, the foliage is inoculated with a suspension of spores of the early blight fungus (*Alternaria solani*) and the foliage is then placed in a chamber where conditions of temperature and humidity suitable for optimum infection are maintained. When sufficient time has elapsed for the formation of visible lesions the foliage is examined. It is found that the treated foliage has 2% disease compared to 100% on the non-treated.

A similar composition containing the active chemical at a concentration of 0.008% is applied to apple foliage. The foliage is inoculated with spores of apple scab fungus (*Venturia inaequalis*) and placed in a chamber where conditions of temperature and humidity suitable for optimum infection was maintained. The treated foliage has 7% disease compared to 100% for non-treated.

In place of bis-(3,3-ethylsulfonyl)propionic acid, ethyl ester, there can be used in the above formulation any of the ester-type compounds shown above. For example, the compound bis(3,3-methylsulfonyl)propionic acid, ethyl ester, can be employed in place of the compound of Example 1 in the above composition. Such a composition when mixed with water, in an amount such that the aqueous formulation contains 0.2% the propionic acid derivative is sprayed on bean foliage. After the deposit has dried, the foliage is inoculated with a suspension of spores of bean rust fungus (*Uromyces appendiculatus*) and placed in a chamber where conditions of temperature and humidity suitable for optimum infection are maintained. After sufficient time has elapsed for the formation of visible lesions, the foliage is examined. It is found that the treated foliage has substantially less disease than the untreated.

EXAMPLE 23

A suitable wettable powder of the following composition is blended, micropulverized and reblended.

| | Parts |
|---|---|
| 3,3-bis(phenylsulfonyl)propionic acid, ethyl ester | 50 |
| Alkyl naphthalene sulfonic acid, sodium salt | 0.5 |
| Methyl cellulose, low viscosity | 0.25 |
| Attapulgite clay | 49.25 |

The resultant wettable powder is suitable for application as an agricultural fungicide. An aqueous suspension of the powder having the active ingredient present at a concentration level of 0.2% is applied to tomato foliage. The foliage is later inoculated with spores of late blight fungus (*Phytophthora infestans*) and placed in a chamber where conditions of temperature and humidity suitable for optimum infection are maintained. After sufficient time has elapsed for the formation of visible lesions, the foliage is examined. It is found that the treated foliage has substantially less disease than the non-treated.

Also, in place of the phenyl sulfonyl derivative in the composition of this example, one can use any ester or nitrile falling within the scope of formula 1. Thus, for example, the compound 3,3-bis(ethylsulfonyl)propionitrile can be employed as the active ingredient in a composition of this example to effectively control the fungus causing black spot of rose (*Diplocarpon rosae*).

EXAMPLE 24

A suitable wettable powder of the following composition is prepared by mixing the ingredients and passing the mixture thru a micropulverizer:

| | Parts |
|---|---|
| Bis-(3,3-ethylsulfonyl)propionic acid, n. butyl ester | 50 |
| Synthetic calcium silicate (micro-cel) | 49.25 |
| Low viscosity methyl cellulose | 0.25 |
| Alkylated naphthalene sodium sulfonate (commercial wetting agent) | 0.50 |

When made into an aqueous suspension by the addition of water, this suspension is suitable for a foliar spray. A suspension containing 0.2% of the propionic acid derivative is sprayed on peony foliage. After the deposit has dried, the foliage is inoculated with a suspension of spores of *Botrytis paeoniae*. The foliage is then placed in a chamber where temperature and humidity suitable for optimum infection are maintained. When sufficient time has elapsed for the formation of visible lesions, the foliage is examined. It is found that the treated foliage has substantially less disease than non-treated.

In place of the propionic acid derivative of the above composition, octyl ester of Example 7 can be employed in an equal amount by weight to prepare a suitable wettable powder. Such a powder wets readily and forms a good dispersion when mixed with a large quantity of water. Such a dispersion is effective in controlling the downy mildew of grapes caused by *Plasmopara viticola*.

EXAMPLE 25

A free-flowing dust is prepared by blending 50 parts of 3,3-bis-(methylsulfonyl)propionic acid, methyl ester, and
50 parts of kaolin clay and passing the resulting blend through a micropulverizer. This blend is then diluted with micaceous talc to 20% active in a ribbon blendor. The resultant free-flowing powder is readily applicable to areas to be protected from fungi or bacteria attack by conventional dusting equipment.

In like manner, any other solid bis-(alkyl sulfonyl and sulfoxyl) derivative of formula 1 can be incorporated into a powdery pesticidal formulation.

This application is a continuation-in-part of U.S. application Serial No. 583,895, filed May 10, 1956, now abandoned.

The claims are:

1. A compound characterized by the formula 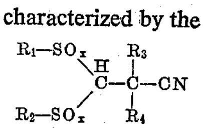 where: $R_1$ and $R_2$ are selected from the group consisting of hydroxy lower alkyl, halo lower alkyl, nitro lower alkyl, cyano lower alkyl, lower alkyl, nitrophenyl, chlorophenyl, and phenyl; $R_3$ and $R_4$ are selected from the group consisting of hydrogen, hydroxy lower alkyl, halo lower alkyl, nitro lower alkyl, cyano lower alkyl, and lower alkyl; and $x$ is a positive whole number less than 3.

2. A compound characterized by the formula where: $R_1$ and $R_2$ are selected from the group consisting of hydroxy lower alkyl, halo lower alkyl, nitro lower alkyl, cyano lower alkyl, lower alkyl, nitrophenyl, chlorophenyl, and phenyl; $R_3$ and $R_4$ are selected from the group consisting of hydrogen, hydroxy lower alkyl, halo lower alkyl, nitro lower alkyl, cyano lower alkyl, and lower alkyl; $R_5$ is an alkyl radical containing from 1 through 18 carbon atoms; and, $x$ is a positive whole number less than 3.

3. Bis-(3,3-ethylsulfonyl) propionic acid, ethyl ester.
4. Bis-(3,3-ethylsulfonyl) propionitrile.

References Cited in the file of this patent

UNITED STATES PATENTS

| | | |
|---|---|---|
| 2,413,814 | De Groote et al. | Jan. 7, 1947 |
| 2,452,187 | Gresham | Oct. 26, 1948 |
| 2,496,661 | Denton | Feb. 7, 1950 |
| 2,557,519 | Skinner et al. | June 19, 1951 |
| 2,618,582 | Buckmann | Nov. 18, 1952 |

OTHER REFERENCES

Rothstein: J. Chem. Soc. (London), December 1940, pages 1560–1565.

Bohme et al.: Chem. Abstracts, vol. 40, pages 2809–2811 (1944).